United States Patent
Cai et al.

(10) Patent No.: US 11,789,320 B2
(45) Date of Patent: Oct. 17, 2023

(54) DISPLAY PANEL AND DISPLAY DEVICE

(71) Applicant: HKC CORPORATION LIMITED, Shenzhen (CN)

(72) Inventors: Qing Cai, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/945,070

(22) Filed: Sep. 14, 2022

(65) Prior Publication Data

US 2023/0080340 A1   Mar. 16, 2023

(30) Foreign Application Priority Data

Sep. 15, 2021   (CN) .......................... 202111077906.X (51) Int. Cl.
*G02F 1/1339*   (2006.01)
*G02F 1/1335*   (2006.01)
*G02F 1/1368*   (2006.01)

(52) U.S. Cl.
CPC ........ *G02F 1/13394* (2013.01); *G02F 1/1368* (2013.01); *G02F 1/133512* (2013.01); *G02F 1/133514* (2013.01)

(58) Field of Classification Search
None
See application file for complete search history.

(56) References Cited

U.S. PATENT DOCUMENTS

2016/0041416 A1 *   2/2016   Zhang .................... G02B 7/006
                                                          438/151

FOREIGN PATENT DOCUMENTS

| CN | 105137865 | A |   | 12/2015 |   |
|----|-----------|---|---|---------|---|
| CN | 105929607 | A | * | 9/2016  |   |
| CN | 105929607 | A |   | 9/2016  |   |
| CN | 206479745 | U |   | 9/2017  |   |
| CN | 109143691 | A | * | 1/2019  | ......... G02F 1/13394 |
| CN | 111025780 | A | * | 4/2020  |   |
| WO | WO-2014075330 | A1 | * | 5/2014 | ............ F16B 5/0266 |

* cited by examiner

*Primary Examiner* — Shan Liu (57) ABSTRACT

A display panel and a display device are disclosed. The display panel includes a first substrate and a second substrate that are aligned and bonded together, and further includes a spacer disposed between the first substrate and second substrate. One end of the spacer is disposed on the second substrate, and the other end faces the first substrate. The first substrate further includes a first limiting groove that is disposed on one side adjacent to the second substrate and that corresponds to a position of the spacer. The other end of the spacer extends into the first limiting groove. A first limiting protruding strip is disposed on a groove wall of the first limiting groove, and the surface of the first limiting protruding strip facing the spacer abuts against the side wall of the spacer, defining a gap between the spacer and the groove wall of the first limiting groove.

11 Claims, 5 Drawing Sheets

DISPLAY PANEL AND DISPLAY DEVICE

CROSS-REFERENCE TO RELATED APPLICATIONS

This application claims the priority and benefit of Chinese patent application CN202111077906X, entitled "Display Panel and Display Device" and filed Sep. 15, 2021, with China National Intellectual Property Administration, the entire contents of which are incorporated herein by reference.

TECHNICAL FIELD

This application relates to the field of display technology, and more particularly relates to a display panel and a display device.

BACKGROUND

In the existing liquid crystal display (LCD) technology, the display panel is usually formed by aligning and bonding a color filter substrate and an array substrate together to form a cell, and filling liquid crystal between the color filter substrate and the array substrate. In order to ensure the stability of the liquid crystal gap in each area of the display panel, the cell is mainly supported by setting spacers between the color filter substrate and the array substrate. One end of the spacer is usually fixed to the color filter substrate, and the other end is in contact with the array substrate. But the end abutting on the array substrate is freely movable. When the display panel is squeezed by an external force during transportation or use, the spacer will slide, which will affect the support stability of the color filter substrate and the array substrate.

SUMMARY

It is therefore a purpose of the present application to provide a display panel and a display device. By arranging the first limiting groove and the first limiting protruding strip, the sliding of the spacer is reduced and the support stability of the spacer is enhanced.

The present application discloses a display panel including a first substrate, a second substrate and a spacer. The first substrate and the second substrate are aligned and bonded together to form a cell. The spacer is disposed between the first substrate and the second substrate. One end of the spacer is disposed on the second substrate, and the other end faces the first substrate. The first substrate further includes a first limiting groove disposed in one side adjacent to the second substrate, the first limiting groove corresponds to the position of the spacer, and the other end of the spacer extends into the first limiting groove. The groove wall of the first limiting groove is provided with a first limiting protruding strip, and the surface of the first limiting protruding strip facing the spacer is in contact with the side wall of the spacer, so that there is a gap between the spacer and the groove wall in the first limiting groove.

Optionally, the first substrate is an array substrate, the second substrate is a color filter substrate, the first limiting groove is arranged on the array substrate, and the spacer is arranged on the color filter substrate.

Optionally, the array substrate includes a thin film transistor and a passivation layer disposed on the thin film transistor. A via hole is formed between the passivation layer and the thin film transistor, and the inner wall of the via hole is provided with a transparent conductive layer. The first limiting groove is the via hole. The first limiting protruding strip is arranged in the via hole, so that there is a gap between the spacer and the transparent conductive layer.

Optionally, the array substrate includes a thin film transistor and a passivation layer disposed on the thin film transistor, the first limiting groove is a groove, and the groove is disposed in the passivation layer and corresponds to the position of the spacer. And the groove opening width of the groove is larger than the width of the spacer. The first limiting protruding strip is arranged on the inner wall of the groove.

Optionally, the first substrate is a color filter substrate, the second substrate is an array substrate, the first limiting groove is arranged on the color filter substrate, and the spacer is arranged on the array substrate.

Optionally, the color filter substrate is provided with a light-shielding portion, and the light-shielding portion is formed by stacking at least two color filter layers of different colors. The color filter layer at least includes a first color filter layer and a second color filter layer, the light shielding portion is recessed corresponding to the position of the spacer to form the first limiting groove. And corresponding to the first limiting groove, the thicknesses of the first color filter layer and the second color filter layer are smaller than the thicknesses of other positions; the first limiting protruding strips are arranged on the inner wall of the first limiting groove.

Optionally, the first substrate further includes a limiting ring disposed outside the first limiting groove, the height of the limiting ring is higher than the height of the first limiting groove, and the diameter of the limiting ring corresponding to the first limiting groove is larger than the groove opening width of the first limiting groove; wherein, the center of the first limiting groove coincides with the center of the limiting ring.

Optionally, the first substrate further includes extending protruding strips, a plurality of the extending protruding strips are provided, and a plurality of the extending protruding strips are arranged at intervals between the limiting ring and the first limiting groove, and are arranged in parallel with the extending direction of the first limiting groove toward the limiting ring.

Optionally, the display panel further includes an auxiliary spacer, the height of the auxiliary spacer is smaller than the height of the spacer, one end of the auxiliary spacer is disposed on the second substrate, and the other end faces the first substrate, and is spaced from the spacer; the first substrate further includes a second limiting groove disposed one side close to the second substrate, the second limiting groove corresponds to the position of the auxiliary spacer, and the second limiting groove is provided with a second limiting protruding strip; the auxiliary spacer is suspended.

The present application further discloses a display device, including a backlight module and any display panel disclosed in the present application, wherein the backlight module is arranged on the side of a light incident surface of the display panel.

Compared with the solution in which the spacer will slide and affect the support stability of the two substrates, in the display panel of the present application, the surface of the first limiting protruding strip that abuts against the spacer is separated from the groove wall of the first limiting groove by a distance, so that there is a gap between the position where the spacer is in contact with the first limit protruding strip and the groove wall of the first limiting groove at the adjacent position. When the display panel is subjected to external force or pressure test, the spacer has deformation space, the stress can be released, and it is not easy to jump out of the first limiting groove. The first limiting rib sinks into the deformed spacer surface, which increases the contact area with the spacer (the first limiting rib is embedded into the spacer surface like a claws), which can better clamp the spacer to better limit the movement of the spacer. Furthermore, the firmness between the spacer and the first limiting groove is increased, the support effect of the spacer is ensured, the dislocation of the two substrates is avoided, and the risk of light leakage is avoided, and the stability and display effect of the display panel are guaranteed.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Apparently, the drawings used in the following description merely depict some embodiments of the present application, and for those having ordinary skill in the art, other drawings can also be obtained from these drawings without investing creative effort. In the drawings.

In the drawings: 100, display device; 200, display panel; 210, first substrate; 211, first limiting groove; 212, first limiting protruding, strip; 213, groove; 214, limiting ring; 215, extending protruding strip; 216, first via hole; 217, second limiting groove; 218, second via hole; 219, second limiting protruding strip; 220, second substrate; 221, spacer; 222, auxiliary spacer; 230, array substrate; 231, thin film transistor; 232, via hole; 233, transparent conductive layer; 234, gate electrode; 235, insulating, layer: 236, semiconductor layer: 237, source electrode; 238, drain electrode; 239, passivation layer; 240, color filter substrate; 241, black matrix; 242, light-shielding portion; 243, color filter layer; 244, first color filter layer; 245, second color filter layer; 300, backlight module.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added.

In addition, terms such as "center", "transverse", "lateral", "above", "on", "under", "below", "left", "right", "vertical", "horizontal", "top", "bottom", "inside", "outside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments.

Figure 1:
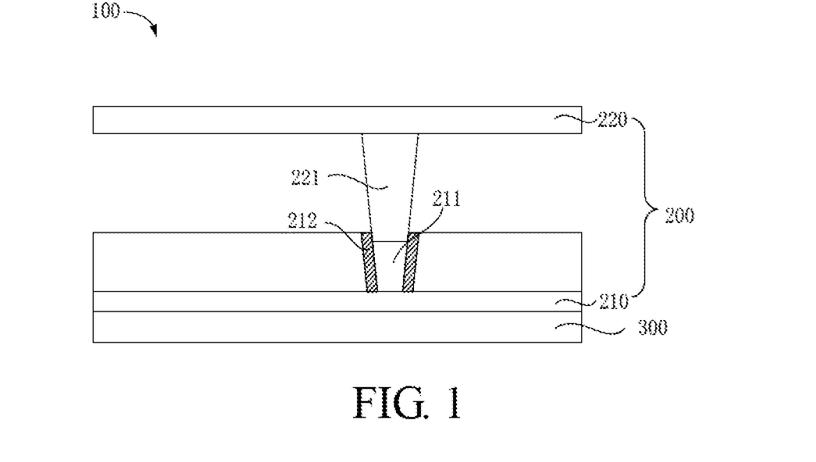
FIG. 1 is a schematic diagram of an embodiment of a display device according to the present application.

FIG. 1 is a schematic diagram of an embodiment of the display device of the present application. Referring to FIG. 1, the present application discloses a display device 100, which includes a backlight module 300 and a display panel 200. The backlight module 300 is disposed on the light-incident surface side of the display panel 200.

In this embodiment, the display device 100 mainly includes two parts, the display panel 200 and the backlight module 300. The display panel 200 itself does not emit light, and needs to be used in conjunction with the backlight module 300, and the backlight module 300 provides it with a light source, so that the display panel 200 can display images normally. Especially the liquid crystal display panel 200, the display panel 200 is usually composed of two substrates and a liquid crystal layer sandwiched between the two substrates. The liquid crystal layer usually includes an alignment film and liquid crystal molecules. By applying electrical signals to the two substrates, the liquid crystal molecules on the alignment film are driven to rotate, and the strength of the electrical signals is adjusted to change the rotation angle of the liquid crystal molecules, so that the light of the backlight module 300 transmits light waves of different brightness through the substrates, which is finally recognized by the human eye and presents a different display screen.

In order to ensure the support stability of the display screen, a spacer 221 is also arranged between the two substrates, and the cell body is supported by the spacer 221. In addition, a first limiting groove 211 and a first limiting protruding strip 212 are arranged on the substrate corresponding to one end of the spacer 221 to prevent the spacer 221 from sliding, and to improve the support stability of the spacer 221, thereby preventing image unevenness caused by partial collapse, and improving the display effect of the display device 100. The first limiting groove 211 may be formed on a passivation layer, a planarization layer, a light-shielding film or other film layers.

When the display device 100 of the present application is subjected to an external force or a pressure test, the support between the display panels 200 is more stable, and there is no phenomenon that the display panel 200 displays abnormally due to the sliding of the spacer 221, such as bright spots or light leakage on the display panel 200, which ensures the yield and stability of the display device 100 and improves the service life of the display device 100, and the user experience is better.

The display device 100 in the present application may be a display product such as a mobile phone, a liquid crystal display computer, a liquid crystal display television, a digital camera, etc., which is not specifically limited here.

Figure 2:
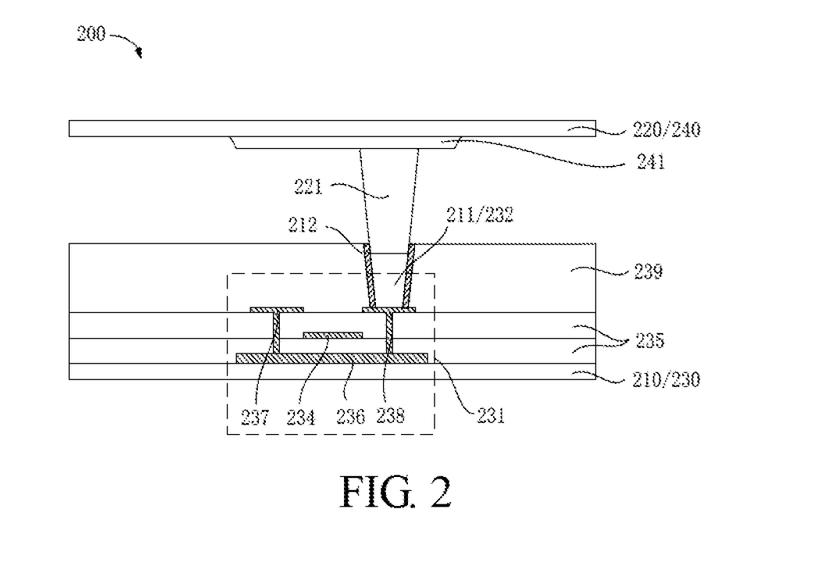
FIG. 2 is a schematic diagram of a first embodiment of the display panel of the present application.

The present application mainly makes targeted improvements to the display panel 200 in the display device 100, as follows:

FIG. 2 is a schematic diagram of the first embodiment of the display panel of the present application. As shown in FIG. 2, the present application discloses a display panel 200, including a first substrate 210, a second substrate 220 and a spacer 221. The first substrate 210 and the second substrate 220 are aligned and bonded together to form a cell. The spacer 221 is disposed between the first substrate 210 and the second substrate 220. One end of the spacer 221 is disposed on the second substrate 220, and the other end faces the first substrate 210. The first substrate 210 further includes a first limiting groove 211 disposed on a side close to the second substrate 220. The first limiting groove 211 corresponds to the position of the spacer 221, and the other end of the spacer 221 extends into the first limiting groove 211. A first limiting protruding strip 212 is provided on the groove wall of the first limiting groove 211. And the surface of the first limiting protruding strip 212 facing the spacer 221 is in contact with the side wall of the spacer 221, so that there is a gap between the spacer 221 and the groove wall in the first limiting groove 211.

Compared with the solution in which the spacer 221 will slide and affect the support stability of the two substrates, in the display panel 200 of the present application, there is a distance between the surface of the first limiting protruding strip 212 abutting against the spacer 221 and the groove wall of the first limiting groove 211, so that there is a gap between the position where the spacer 221 abuts the first limiting protruding strip 212 and the groove wall of the first limiting groove 211 at the adjacent position. When the display panel 200 is subjected to an external force or a pressure test is performed, the spacer 221 has a deformation space, the stress can be released, and it is not easy to jump out from the first limiting groove 211. The first limiting protruding strip 212 sinks into the deformed surface of the spacer 221, increasing the contact area with the spacer 221 (the first limiting protruding strip 212 is embedded in the surface of the spacer 221 like a claw), the spacer 221 is better clamped, and the movement of the spacer 221 is better limited. At the same time, the firmness between the spacer 221 and the first limiting groove 211 is increased, the support effect of the spacer 221 is ensured, the dislocation of the two substrates is avoided, and the risk of light leakage is avoided, and the stability and display effect of the display panel 200 is ensured.

In the actual manufacturing process, a spacer 221 is arranged between the two substrates, one end of the spacer 221 is fixed on the second substrate 220, and on the first substrate 210, a first limiting groove 211 is provided corresponding to the position of the spacer 221. The spacer 221 extends into the first limiting groove 211, so that the movement range of the spacer 221 is limited within the first limiting groove 211, and a first limiting protruding strip 212 is arranged on the groove wall of the first limiting groove 211, and at the same time, the side wall of the spacer 221 is abutted against the first limiting protruding strip 212, so as to ensure the supporting effect of the spacer 221, and the spacer 221 is also prevented from sliding toward the pixel area thus scratching the alignment film or the transparent conductive layer.

Specifically, the first limiting protruding strip 212 may be configured as an elongated strip structure extending from the top of the groove wall of the first limiting groove 211 and toward the bottom of the first limiting groove 211. The surface of the first limiting protruding strip 212 facing the spacer 221 is set to be parallel to the side wall of the spacer 221, so that the first limiting protruding strip 212 also has a certain guiding effect on the spacer 221. When the display panel 200 is subjected to an external force or a pressure test is performed, the spacer 221 will slide along the extending direction of the first limiting protruding strip 212 toward the direction of the first substrate 210, and will not easily jump out of the first limiting groove Step 211, further preventing the spacer 221 from sliding toward the pixel area, avoiding abnormal display of the display panel 200, and ensuring the stability and display effect of the display panel 200.

In the display panel 200 of the present application, the first substrate 210 may be one of an array substrate 230, a color filter substrate 240, a COA (Color Filter On Array, a color filter is arranged on the array substrate 230) substrate, a glass substrate, and the like. When the first substrate 210 is the array substrate 230, the second substrate 220 is the color filter substrate 240, the first limiting groove 211 is disposed on the array substrate 230; the spacer 221 is disposed on the color filter substrate 240.

In this embodiment, the array substrate 230 is arranged on the light incident surface side of the display panel 200, and the color filter substrate 240 and the array substrate 230 are aligned and bonded together to form a cell. The color filter substrate 240 is provided with a black matrix 241, which is used to block other parts of the array substrate 230 than the pixel area, such as the thin film transistor 231, scan lines and data lines in the non-pixel area, etc. One end of the spacer 221 is disposed on the black matrix 241 of the color filter substrate 240, and the other end is disposed to face toward the array substrate 230. In addition, on the array substrate 230, the first limiting groove 211 and the first limiting protruding strip 212 are disposed corresponding to the position of the spacer 221 to prevent the spacer 221 from sliding and ensure the support effect of the spacer 221.

Figure 3:
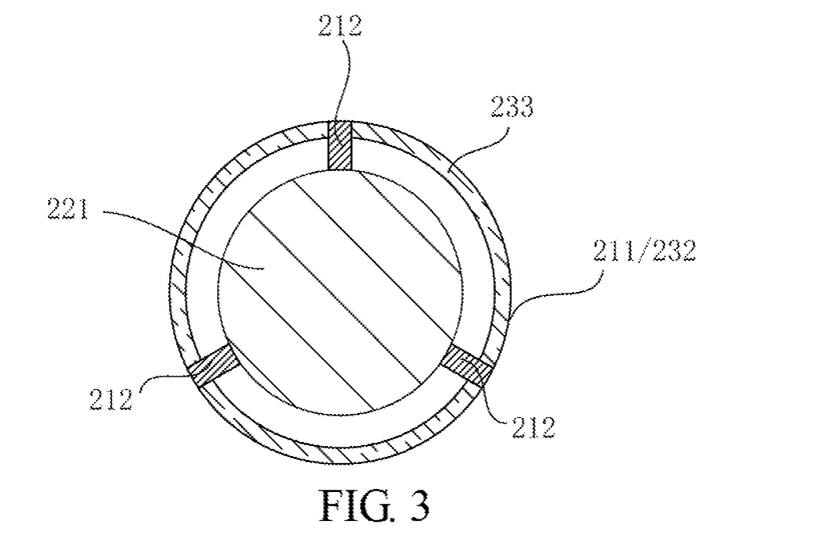
FIG. 3 is a schematic top view of the first embodiment of the display panel of the present application.

FIG. 3 is a schematic top view of the first embodiment of the display panel of the present application. In connection with FIGS. 2 and 3, the array substrate 230 includes a thin film transistor 231 and a passivation layer 239 disposed on the thin film transistor 231. A via hole 232 is formed between the passivation layer 239 and the thin film transistor 231, and the inner wall of the via hole 232 is provided with a transparent conductive layer 233. The first limiting groove 211 is the via hole 232. The first limiting protruding strip 212 is disposed in the via hole 232 so that there is a gap between the spacer 221 and the transparent conductive layer 233.

In this embodiment, the array substrate 230 includes a thin film transistor 231 and a passivation layer 239 disposed on the thin film transistor 231. The thin film transistor 231 includes a gate electrode 234, a semiconductor layer 236, an insulating layer 235, a source electrode 237 and a drain electrode 238. The first limiting groove 211 may be a via hole 232. The via hole 232 is formed between the passivation layer 239 and the thin film transistor 231 to expose the drain electrode 238. By disposing the transparent conductive layer 233 on the inner wall of the via hole 232 to connect with the drain electrode 238, the first limiting protruding strip 212 is arranged on the inner wall of the via hole 232, and then the spacer 221 abuts against the first limiting protruding strip 212, there is a gap between the spacer 212 and the transparent conductive layer 233, so as to prevent the transparent conductive layer 233 and the spacer 212 from being worn and disconnected. Generally, the transparent conductive layer 233 can be made of ITO (indium tin oxide) material, or can be replaced by Nano silver wire, conductive polymer, ITO ink material, etc.

The thin film transistor 231 of the present application may have a top gate structure or a bottom gate structure. In each embodiment of the present application, only the thin film transistor 231 of a top gate structure is taken as an example for description. A first limiting, protruding strip 212 is disposed on the inner wall of the via hole 232. The first limiting protruding strip 212 may be configured as a protruding structure extending from the inner wall of the via hole 232 toward the center of the via hole 232. The first limiting protruding strip 212 protrudes from the inner wall of the via hole 232, and directly abuts the side wall of the spacer 221 against the first limiting protruding strip 212. The first limiting protruding strip 212 secures the spacer 221 at the center of the via hole 232, which increases the firmness between the spacer 221 and the via hole 232 and ensures the support effect of the spacer 221.

In order to ensure the support stability of the spacer 221, there are at least two first limiting protruding strips 212, which are evenly arranged. At least two first limiting protruding strips 212 can disperse the contact pressure of the spacer 221, so that the spacer 221 is stressed more evenly; so as to ensure the support stability of the spacer 221, and can also prevent the spacer 221 from tilting to one side resulting in the dislocation of the two substrates. In addition, a gap is provided between the adjacent first limiting protruding strips 212, and the transparent conductive layer 233 is disposed at the gap between the adjacent first limiting protruding strips 212, which can also prevent the side wall of the spacer 221 from directly contacting the inner wall of the via hole 232, avoid damage to the transparent conductive layer 233, prevent the possibility of disconnection, and further improve the stability of the display panel 200.

In addition, the sidewall of the spacer 221 abuts against the first limiting protruding strip 212. When the display panel 200 is subjected to pressure or a pressure test is performed, since the first limiting protruding strip 212 protrudes from the sidewall of the via hole 232, the first limiting protruding strip 212 also has a certain guiding function. Even if the spacer 221 is stressed, the spacer 221 will slide toward the bottom of the via hole 232, the sliding range is limited within the via hole 232, and there is no possibility of sliding to the pixel area. When the external force is removed, the spacer 221 can also be quickly reset along the extending direction of the first limiting protruding strip 212. Moreover, the gap between the adjacent first limiting protruding strips 212 also forms a deformation space for the spacer 221, so that the stress can be released in time, the damage of the spacer 221 is avoided, and the service life of the display panel 200 is prolonged.

Typically, three first limiting protruding strips 212 are provided in the via hole 232, and the three first limiting protruding strips 212 are evenly arranged along the inner wall of the via hole 232, so that when the spacer 221 is in contact with the first limiting protruding strips 212, the stress points between the spacer 221 and the first limiting protruding strips 212 are evenly distributed in three positions in the via hole 232, and the three positions ensure that the force points of the spacers 221 are in the same plane. Based on the stability principle of the triangle, the support effect of the spacers 221 is further ensured, and the support stability of the two substrates can also be improved. Of course, more than three first limiting protruding strips 212 may be provided, or a plurality of first limiting protruding strips 212 may be evenly arranged between adjacent first limiting protruding strips 212 to disperse the contact pressure of the spacers 221 and improve the support stability of the spacer 221.

In the actual manufacturing process, the first limiting ribs 212 and the via holes 232 can be formed in the same process without adding additional processes. The shape of the first limiting protrusions 212 can be designed in advance on the photo mask. When the via holes 232 are formed, the first limiting ribs 212 are formed at the same time, where the same process is used. In this way, the first limiting ribs 212 are formed by the passivation layer 239 itself. That is, the first limiting protruding strips 212 are made of the passivation layer 239 material, which can enhance the firmness between the first limiting protruding strips 212 and the via holes 232, reduce manufacturing costs, and improve production efficiency.

In addition, the first limiting protruding strips 212 may also be fabricated by a separate process after the via holes 232 are formed, and the first limiting protruding strips 212 may be made of a metal layer material or other non-metal film layer materials. In order to improve the firmness of the connection between the first limiting protruding strips 212 and the via holes 232, the first limiting protruding strips 212 can also be made of photoresist, and the shape of the first limiting protruding strips 212 is formed by processes such as exposure. When the photoresist is peeled off, the photoresist in other regions except the via hole 232 is removed, the photoresist in the via hole 232 is retained, and the first limiting protrusions 212 are formed by curing.

After the two substrates are assembled, the surface where the sidewall of the spacer 221 abuts against the first limiting protruding strip 212 is a first contact surface, and the surface where the first limiting protruding strip 212 contacts the sidewall of the spacer 221 is a second contact surface. The first contact surface and the second contact surface cooperate with each other, and both the first contact surface and the second contact surface can be set as curved surfaces, so that a concave-convex matching structure is formed between the spacer 221 and the first limiting protruding strip 212, and the supporting effect of the spacer 221 is improved. Typically, the curvatures of the two are set to be identical, so that the spacer 221 and the first limiting protruding strip 212 can be fitted without gaps, and the support stability is better.

When the spacer 221 abuts against the first limiting protruding strip 212, the contact surfaces are concave and convex surfaces that match each other. When the display panel 200 is subjected to an external force, the spacer 221 may not slide, but the gap set between the first limiting ribs 212 releases the stress on the spacer 221 in time. In this way, not only the damage of the spacer 221 is avoided, but the risk of dislocation of the two substrates when the display panel 200 is subjected to an external force thereby causing the problem of light leakage is also avoided, which further improves the support stability between the two substrates, and ensures the display effect of the display panel 200.

Figure 4:
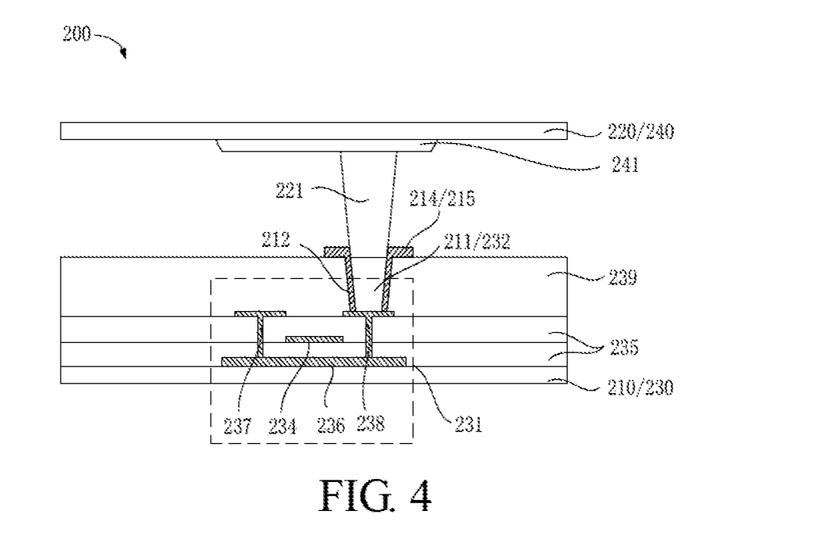
FIG. 4 is a schematic diagram of a second embodiment of the display panel of the present application.
Figure 5:
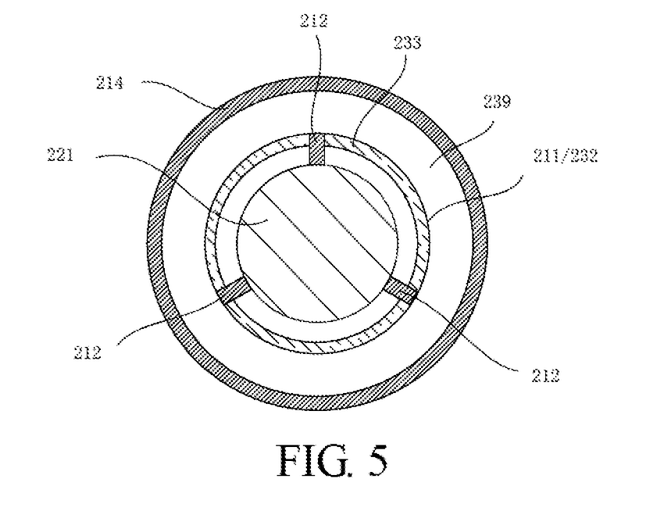
FIG. 5 is a schematic top view of the second embodiment of the display panel of the present application.

FIG. 4 is a schematic diagram of a second embodiment of the display panel of the present application, and FIG. 5 is a schematic top view of the second embodiment of the display panel of the present application. Referring to FIGS. 4 and 5, the first substrate 210 further includes a limiting ring 214 disposed outside the first limiting groove 211, and the height of the limiting ring, 214 is higher than that of the first limiting groove 211, and the diameter of the limiting ring 214 corresponding to the first limiting groove 211 is greater than the width of the opening of the first limiting groove 211; wherein, the centers of the first limiting groove 211 and the limiting ring 214 are coincident.

In this embodiment, the first substrate 210 is the array substrate 230, the second substrate 220 is the color filter substrate 240, the first limiting groove 211 is the via hole 232, and the first limiting protruding strip 212 is disposed on the inner wall of the via hole 232. In order to further improve the stability of the display panel 200 and prevent the spacer 221 from sliding toward the pixel area, a limiting ring 214 is also provided on the side adjacent to the color filter substrate 240 outside the via hole 232. The height of the limiting ring 214 is higher than the height of the first limiting groove 211, and the diameter of the limiting ring 214 is set to be larger than the width of the opening of the first limiting groove 211, so that a limit space is formed outside the first limiting groove 211. When the spacer 221 rebounds and slides out of the first limiting groove 211, the limiting ring 214 limits the spacer 221 again, and the anti-slip effect is better.

In order to prevent the spacer 221 from sliding randomly, the center of the limiting ring 214 is coincident with the center of the first limiting groove 211, so that the distance between the limiting ring 214 and the first limiting groove 211 is uniform at each point, so that even if the spacer 221 slides, it will also slide along the side wall of the limiting ring 214 and within the limiting ring 214, instead of being inclined to a certain position due to the excessive local spacing, and tt is also possible to avoid uneven brightness caused by the inclination of the spacer 221.

The limiting ring 214 may be arranged on the passivation layer 239 and arranged around the via hole 232 in a circle. That is, the section of the limiting ring 214 can be circular, and the edge of the limiting ring 214 is set to be tangent to the edge of the pixel area. When the spacer 221 slides out of the via hole 232, due to the existence of the limiting ring 214, the spacer 221 will not further slide toward the pixel area, further preventing the spacer 221 from sliding toward the pixel area, further preventing the spacer 221 from sliding toward the pixel area, and avoiding the possibility that the spacer 221 may scratch the alignment film or the transparent conductive layer 233.

At this time, even when the display panel 200 is subjected to a large external force and it slides out from the side of the via hole 232, it will not slide to the pixel area. Alternatively, after the external force is removed, when the spacer 221 springs back and slides out of the via hole 232 to the edge of the via hole 232, due to the existence of the limiting ring 214, the spacer 221 will not slide toward the pixel area, which further improves the anti-slip performance of the spacer 221.

In addition, the cross section of the limiting ring 214 can also be set as a polygon or arc tangent to the edge of the iron-pixel area of the array substrate 230, or set as surrounded by a plurality of small protrusions, and the gap between adjacent protrusions is less than the width of the spacer 221, preventing the spacers 221 from slipping out of the gap between the protrusions, and also has the effect of preventing the spacers 221 from sliding into the pixel area.

In order to ensure the anti-skid effect of the limiting ring 214, the height of the limiting ring 214 is set to be equal to one-fifth of the height of the spacer 221, and the height of the limiting ring 214 can also be designed according to the elastic coefficient of the material of the spacer 221. When the limiting ring 214 is composed of a plurality of protrusions, the gap between adjacent protrusions can be set to be less than or equal to half the width of the spacer 221 to prevent the spacer 221 from slipping out of the gap and improve the anti-slip effect.

Figure 6:
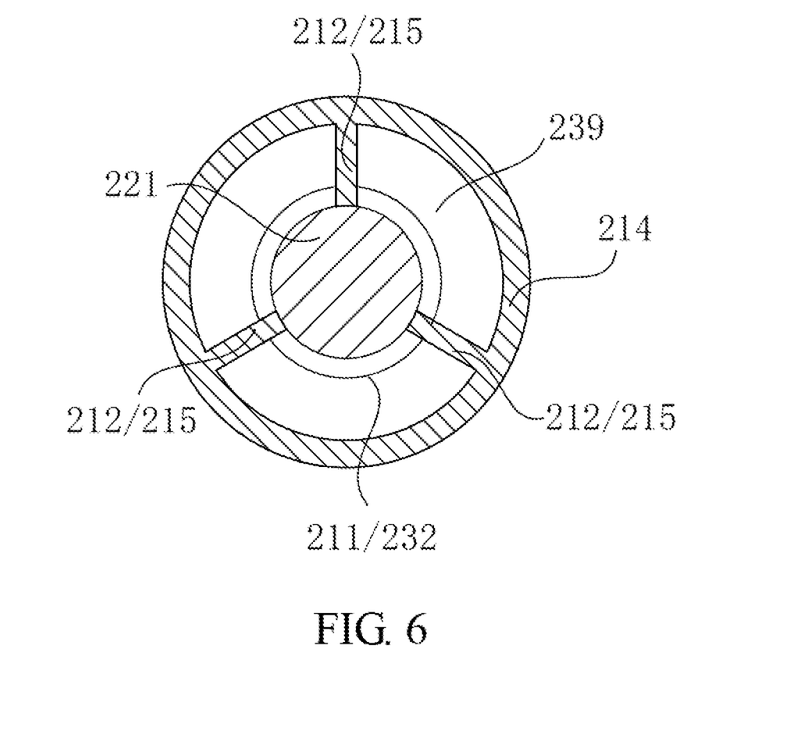
FIG. 6 is a schematic top view of a third embodiment of the display panel of the present application.
Figure 7:
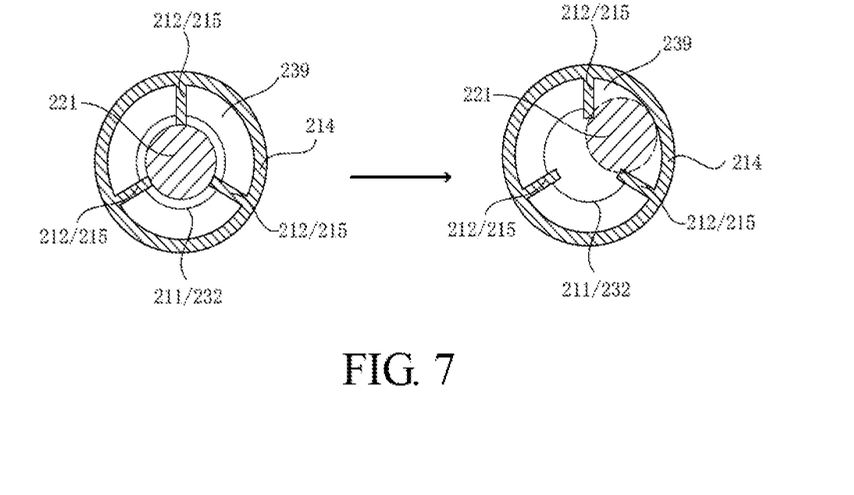
FIG. 7 is a schematic diagram illustrating the sliding changes of the spacer of the third embodiment of the display panel of the present application.

FIG. 6 is a schematic top view of a third embodiment of the display panel of the present application, and FIG. 7 is a schematic view of the sliding changes of the spacer of the third embodiment of the display panel of the present application. Referring to FIGS. 6 and 7, further, when a limiting ring 214 is provided outside the first limiting groove 211, in order to improve the anti-slip effect of the spacer 221, the first substrate 210 further includes an extending protruding strip 215. A plurality of the extending protruding strips 215 are provided, and the plurality of the extending protruding strips 215 are arranged at intervals between the limiting ring 214 and the first limiting groove 211, and are arranged in parallel with the extending direction of the first limiting groove 211 to the limiting ring 214.

In this embodiment, taking the limiting ring 214 disposed on the passivation layer 239 and the first limiting groove 211 being the via hole 232 as an example, an extending, protruding strip 215 is provided between the limiting ring 214 and the via hole 232, and a plurality of extending protruding strips 215 are provided, and are arranged at intervals, parallel to the extending direction of the via hole 232 to the limiting ring 214, and the interval between the adjacent extending protruding strips 215 is set to be greater than or equal to the diameter of the spacer 221, so that the spacer 221 can be located between the adjacent extending protruding strips 215.

Since the spacer 221 has a certain elasticity, when the spacer 221 is subjected to an external force, the gap between the adjacent extending protruding strips 215 also plays a certain guiding role, and the spacer 221 can be slid toward the limiting ring 214, so that the bottom of the spacer 221 is in contact with the passivation layer 239 in the limiting ring 214, and at the same time, the sidewall of the spacer 221 is in contact with the extending protruding strips 215 and the limiting ring 214, and the extended protruding strips 215 and the limiting ring 214 can still play the role of holding the spacer 221 tightly, ensuring the support effect. In this way, even if the spacer 221 slides, the support function of the spacer 221 can be ensured, and the stability of the display panel 200 can be improved.

In addition, when the spacer 221 slides to the limiting ring 214, the side of the spacer 221 not in contact with the limiting ring 214 is partially suspended. That is, the side of the spacer 221 that is not in contact with the limiting ring 214 is above the via hole 232. Even if the spacer 221 is stressed again, the spacer 221 will be inclined toward one side of the via hole 232, so that one side of the spacer 221 falls into the via hole 232, further preventing the spacer 221 from sliding. In this way, the extension protruding strip 215 may be a small protrusion disposed between the limiting ring 214 and the via hole 232, or may be a strip-shaped structure connected with the limiting ring 214 and the via hole 232.

Typically, one end of the extension protruding strip 215 is connected with the first limiting protruding strip 212, and the other end is connected with the limiting ring 214, so that the limiting ring 214, the extending protruding strip 215 and the first limiting protruding strip 212 can be integrated as a whole, the stability is better, and the anti-skid effect of the spacer 221 is better. The three can also be produced by the same process, which reduces manufacturing costs and improves production efficiency.

Figure 8:
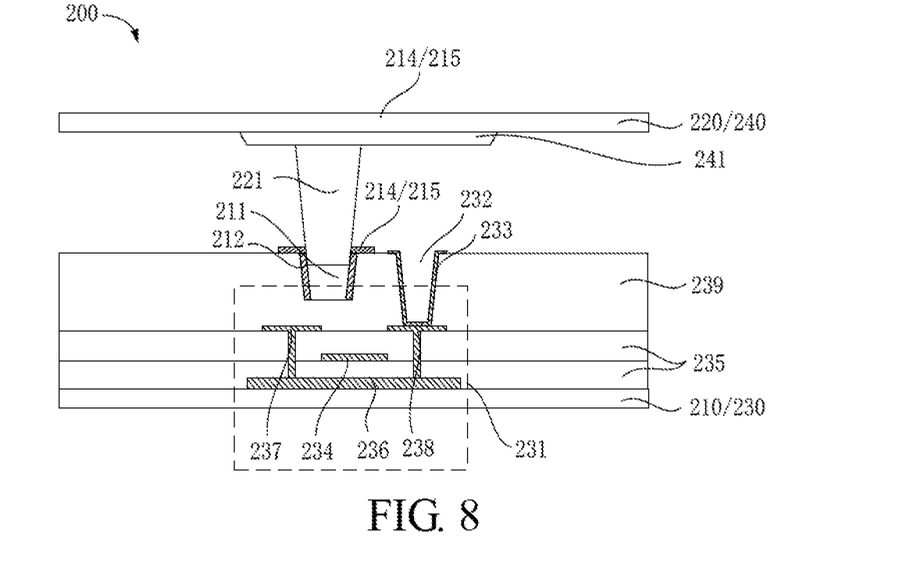
FIG. 8 is a schematic diagram of a fourth embodiment of the display panel of the present application.

FIG. 8 is a schematic diagram of a fourth embodiment of the display panel of the present application. Referring to FIG. 8, the array substrate 230 includes a thin film transistor 231 and a passivation layer 239 disposed on the thin film transistor 231. The first limiting groove 211 is a groove 213, and the groove 213 is disposed on the passivation layer 239 and corresponds to the position of the spacer 221. And the groove opening width of the groove 313 is larger than the width of the spacer 221. The first limiting protruding strip 212 is disposed on the inner wall of the groove 213.

In this embodiment, the first limiting groove 211 may be a groove 213, the first substrate 210 is an array substrate 230, the second substrate 220 is a color filter substrate 240, and the groove 213 is disposed on the passivation layer 239 of the array substrate 230, the width of the opening of the groove 213 is set to be larger than the width of the spacer 221, so that the spacer 221 can be arranged in the groove 213. In addition, a plurality of first limiting protruding strips 212 are arranged on the inner wall of the groove 213 to limit the movement range of the spacer 221 within the groove 213. At the same time, the side wall of the spacer 221 is in contact with the first limiting protruding strips 212, which ensures the supporting effect of the spacers 221 and avoids the risk of dislocation of the two substrates due to external forces, thereby improving the support stability of the display panel 200.

In actual production, the grooves 213 and the first limiting protruding strips 212 can be produced by the same process as the vias 232 used to connect the transparent conductive layer 233 and the drain electrode 238, so there is no need to add redundant processes, and the number of manufacturing processes can be reduced, and the manufacturing costs can be reduced, thereby improving production efficiency. In addition, a limiting ring 214 and an extended protruding strip 215 can also be added to the groove 213 to improve the anti-slip effect of the spacer 221 and improve the stability of the display panel 200.

In addition, the groove 213 can also be formed by the channel region in the source electrode 237 and the drain electrode 238 in the thin film transistor 231, and the first limiting protruding strip 212 is arranged in the channel region. The width of the first limiting protruding strip 212 can be set according to the width of the spacer 221, so that when two substrates are assembled, one end of the spacer 221 just falls into the channel, and the sidewall of the spacer 221 is in contact with the first limiting protruding strip 212, which not only prevents the spacer 221 from sliding, but also ensures the support stability of the spacer 221.

Of course, the first limiting grooves 211 and the first limiting protruding strips 212 may, also be disposed on the color filter substrate 240, that is, the first substrate 210 is the color filter substrate 240, the second substrate 220 is the array substrate 230, the first limiting groove 211 is disposed on the color filter substrate 240, and the spacer 221 is disposed on the array substrate 230.

In this embodiment, one end of the spacer 221 is disposed on the array substrate 230, the other end is disposed toward the color filter substrate 240, and the first limiting groove 211 and the first limiting protruding strip 212 are disposed on the color filter substrate 240. Usually, a black matrix 241 is provided on the color filter substrate 240 corresponding to the spacer 221. The first limiting groove 211 may be a groove 213 formed on the black matrix 241, corresponding to a partial depression at the position of the spacer 221. The first limiting protruding strips 212 are arranged in the grooves 213 to prevent the spacer 221 from sliding, while ensuring the support function of the spacer 221, without affecting the aperture ratio of the display panel 200, and improving the stability of the display panel 200. Moreover, the first limiting groove 211 can be formed simultaneously by using the process of forming the black matrix 241, without adding an additional process and saving economical cost.

Figure 9:
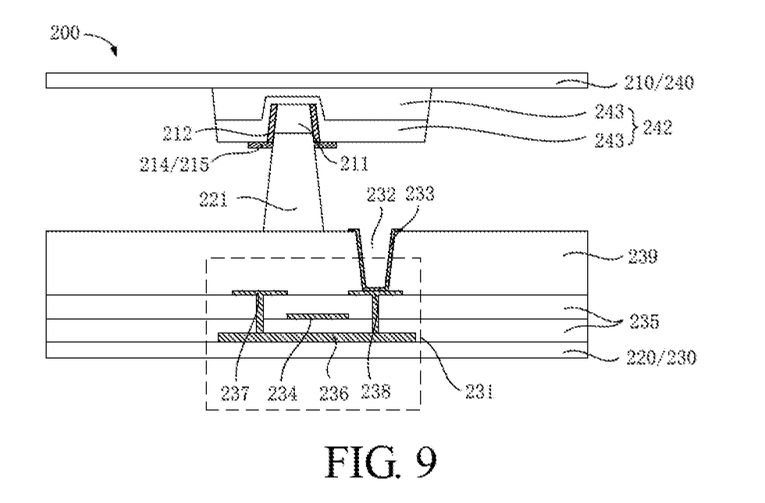
FIG. 9 is a schematic diagram of a fifth embodiment of the display panel of the present application.

FIG. 9 is a schematic diagram of a fifth embodiment of the display panel of the present application. Referring to FIG. 9, as another embodiment of the present application, the color filter substrate 240 is provided with a light shielding portion 242, and the light shielding, portion 242 is formed by stacking at least two color filter layers 243 of different colors. The color filter layer 243 includes at least a first color filter layer 244 and a second color filter layer 245. The light shielding portion 242 is recessed corresponding to the position of the spacer 221 to form the first limiting groove 211. And corresponding to the first limiting groove 211, the thicknesses of the first color filter layer 244 and the second color filter layer 245 are smaller than the thicknesses at other positions. The first limiting protruding strip 212 is disposed on the inner wall of the first limiting groove 211.

In this embodiment, the first limiting groove 211 and the first limiting protruding strip 212 are disposed on the color filter substrate 240, and the light shielding portion 242 of the color filter substrate 240 is formed by stacking, at least two color filter layers 243 of different colors. One end of the spacer 221 is disposed on the array substrate 230, the light shielding portion 242 is recessed corresponding to the position of the spacer 221 to form a first limiting groove 211, and a first limiting, protrusion strip 212 is provided on the inner wall of the first limiting groove 211. The side wall of the spacer 221 abuts against the first limiting protruding strip 212, which limits the sliding range of the spacer 221 within the first limiting groove 211, and ensures the support stability of the spacer 221. Even if the spacer 221 is subjected to an external force, the spacer 221 will slide toward the bottom of the first limiting groove 211 along the extending direction of the first limiting protruding strip 212, which further prevents the spacer 221 from sliding toward the pixel area, preventing the abnormal display phenomenon of the display panel 200.

Specifically, the color filter layer 243 usually includes a red color filter layer (R), a green color filter layer (G) and a blue color filter layer (B). Taking the light-shielding portion 242 formed by stacking two color filter layers 243 of different colors as an example, the light-shielding portion 242 can be composed of at least one of R+B, R+G, or G+B, so as to have a light-shielding effect. That is, the first color filter layer 244 and the second color filter layer 245 are any of the above combinations. When the first limiting groove 211 is formed by the light-shielding portion 242 partially recessed, in order to ensure the light-shielding effect of the light-shielding portion 242, the thicknesses of the first color filter layer 244 and the second color filter layer 245 at the light-shielding portion 242 corresponding to the first limiting groove 211 are smaller than those at other locations, and the color filter layer 243 at other positions of the light shielding portion 242 is thicker. In the actual manufacturing process, the first color filter layer 244 and the second color filter layer 245 may be partially cut thin to form the first limiting groove 211.

The first limiting protruding strip 212 is arranged in the first limiting groove 211, and the first limiting protruding strip 212 can be made of a color filter material, and can be made of the same material as the color filter material of the outermost layer. In this way, the first limiting groove 211 and the first limiting protruding strip 212 are formed at the same time by the same process, which improves the firmness between the first limiting groove 211 and the first limiting protruding strip 212, and can also enhance the shading effect of the first limiting groove 211. Of course, the first limiting protruding strip 212 can also be made of a photoresist material, a black matrix 241 material, or other materials.

Further, in order to enhance the anti-slip effect of the spacer 221, a limiting, ring 214 and an extended protruding strip 215 may be provided on the light shielding, portion 242 corresponding to the position of the first limiting groove 211 to prevent the spacer 221 from sliding, and then sliding toward the pixel area, the alignment film is scratched, resulting in the generation of light spots in the dark state screen, or abnormal display phenomena such as abnormal liquid crystal alignment, which improves the stability of the display panel 200.

In addition, the first substrate 210 may also be a COA substrate. A planarization layer and a color filter layer are arranged on the COA substrate. The first limiting groove 211 may be a groove 213 provided in the planarization layer of the COA substrate. It can also be a groove 213 defined in the planarization layer and extend to the color filter layer on the COA substrate. It can also be a via hole 232 in the COA substrate for connecting the transparent conductive layer and the active switch array, etc. By disposing the first limiting protruding strips 212 in the first limiting groove 211, not only the spacer 221 is prevented from sliding, but also the support stability of the spacer 221 is ensured. In order to enhance the anti-slip effect of the spacer 221, a limiting ring 214 and an extending protruding strip 215 may also be provided.

Usually, in order to ensure the support effect of each position of the display panel 200, a plurality of spacers 221 are provided and evenly arranged. Especially for the large-sized display panel 200, the larger the size is, the more likely the local position of the display panel 200 is to collapse, and then the uneven brightness occurs. However, during the use or handling of the display panel 200, the external pressure is usually random. Therefore, a first limiting groove 211 is provided corresponding to each spacer 221 to prevent the spacer 221 from sliding. At the same time, a first limiting protruding strip 212 is arranged in each first limiting groove 211, and the side wall of the spacer 221 is abutted against the first limiting protruding strip 212 to ensure the supporting effect of the spacer 221, thereby ensuring the support stability of each position of the display panel 200.

Figure 10:
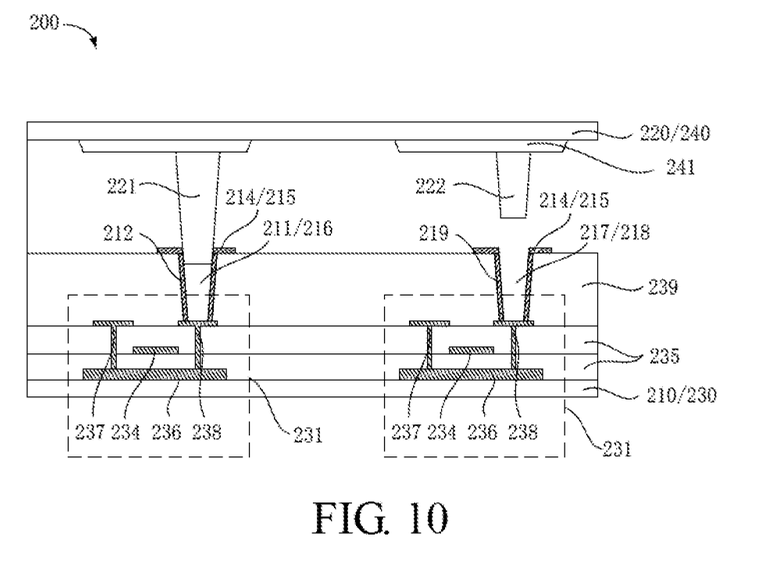
FIG. 10 is a schematic diagram of a sixth embodiment of the display panel of the present application.

FIG. 10 is a schematic diagram of a sixth embodiment of the display panel of the present application. Referring to FIG. 10, the display panel 200 further includes an auxiliary spacer 222. The height of the auxiliary spacer 222 is smaller than the height of the spacer 221. One end of the auxiliary spacer 222 is disposed on the second substrate 220, and the other end faces the first substrate 210 and is spaced from the spacer 221. The first substrate 210 further includes a second limiting groove 217 disposed on a side adjacent to the second substrate 220, the second limiting groove 217 corresponds to the position of the auxiliary spacer 222, and the second limiting groove 217 are provided with second limiting protruding strips 219. The auxiliary spacer 222 is suspended in the air.

In this embodiment, the display panel 200 is also generally provided with an auxiliary spacer 222, and the spacer 221 and the auxiliary spacer 222 are arranged at intervals, and the height of the auxiliary spacer 222 is smaller than that of the spacer 221. Corresponding to the position of the auxiliary spacer 222 on the first substrate 210, a second limiting groove 217 is also provided. Under the normal assembly condition of the display panel 200, the side wall of the spacer 221 abuts the first limiting protruding strip 212 in the first limiting groove 211 to ensure the support stability of the display panel 200. The auxiliary spacer 222 is located between the first substrate 210 and the second substrate 220 and is suspended, that is, the spacer 221 plays a main supporting role.

The arrangement of the first limiting groove 211 in the above-mentioned embodiment can be referred to for the arrangement of the second limiting groove 217. Taking the spacer 221 and the auxiliary spacer 222 disposed on the color filter substrate 240 as an example, the first substrate 210 is an array substrate, and the first limiting grooves 211 and the second limiting grooves 217 are respectively via holes arranged on the array substrate 230 at intervals. The first limiting groove 211 is the first via hole 216 corresponding to the position of the spacer 221. The inner wall of the first via hole 216 is provided with a first limiting protruding strip 212. The second limiting groove 217 is a second via hole 218 corresponding to the position of the auxiliary spacer 222. The inner wall of the second via hole 218 is provided with a second limiting protruding strip 219. When the two substrates are normally assembled, the side wall of the spacer 221 is in contact with the first limiting protrusion 212 to ensure the stable support of the two substrates. The auxiliary spacer 222 is suspended in the air, does not extend into the second via hole 218, and does not contact the second limiting protruding strip 219.

When the display panel 200 is subjected to an external force or a pressure test is performed, if the pressure is small, the spacer 221 is in contact with the first limiting protruding strip 212, locked in the first via hole 216, and will not slide. If the pressure is too high, the spacer 221 slides toward the bottom of the first via hole 216. When the sliding distance of the spacer 221 is too large, the auxiliary spacer 222 moves in the direction of the second via hole 218. When the auxiliary spacer 222 is located in the second via hole 218, the sidewall of the auxiliary spacer 222 abuts against the second limiting protruding strip 219. At this time, the auxiliary spacer 222 play the role of supporting the substrate, share a part of the pressure of the spacer 221, ensure the support stability of the display panel 200, and also prevent the spacer 221 from being damaged.

Due to the existence of the second limiting protruding strip 219, even if the external force is too large, the auxiliary spacer 222 will slide along the second limiting protruding strip 219, and will not slide out of the second via hole 218, and thus will not scratch the transparent conductive layer 233 or scratch the pixel area, and the stability of the display panel 200 is better.

In order to improve the anti-slip effect of the spacer 221 and the auxiliary spacer 222, in addition to the first limiting groove 211 and the second limiting groove, a limiting ring 214 and an extending protruding strip 215 can also be correspondingly provided. In this way, not only the spacer 221 can be prevented from sliding, toward the pixel area, but also the auxiliary spacer 222 can be prevented from sliding toward the pixel area, and the display panel 200 can withstand greater pressure, which is especially suitable for a touch screen or an outdoor screen.

In addition, the second limiting groove 217 can also be set different from the first limiting groove 211, for example, the first limiting groove 211 is a via hole, and the second limiting groove 217 may be a groove provided in the passivation layer can the planarization layer, etc., as long as the spacer 221 and the auxiliary spacer 222 can be prevented from sliding and the stability of the display panel 200 can be improved, where no specific limitation is made herein.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA. (Vertical Alignment) display panels, and MVA (Multi-Domain Vertical Alignment) display panels, where the above solutions can be applied.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A display panel, comprising a first substrate, a second substrate, and a spacer;
    wherein the first substrate and the second substrate are aligned and bonded together to form a cell; wherein the spacer is arranged between the first substrate and the second substrate; one end of the spacer is arranged on the second substrate, and another end of the spacer faces towards the first substrate;
    wherein the first substrate further comprises a first limiting groove that is disposed on a side of the first substrate adjacent to the second substrate and that corresponds to a position of the spacer, and wherein the another end of the spacer extends into the first limiting groove;
    wherein at least one first limiting protruding strip is disposed on a groove wall of the first limiting groove, and a surface of the at least one first limiting protruding strip facing towards the spacer abuts against a side wall of the spacer, defining a gap between the spacer and the groove wall of the first limiting groove;
    wherein the first substrate is an array substrate, the second substrate is a color filter substrate; wherein the first limiting groove is disposed on the array substrate, and the spacer is disposed on the color filter substrate;
    wherein the array substrate comprises a thin film transistor and a passivation layer disposed on the thin film transistor; wherein a via hole is formed between the passivation layer and the thin film transistor, and wherein a transparent conductive layer is disposed on an inner wall of the via hole;
    wherein the first limiting groove is the via hole, and the at least one first limiting protruding strip is arranged in the via hole, defining a gap between the spacer and the transparent conductive layer;
    wherein the surface of the at least one first limiting protruding strip facing towards the spacer is parallel to the sidewall of the spacer, wherein the at least one first limiting protruding strip comprises at least two first limiting protruding strips, and wherein a gap is further defined between every two adjacent first limiting protruding strips, and the transparent conductive layer is arranged at the gap between every two adjacent first limiting protruding strips;
    wherein there are disposed three first limiting protruding strips in the via hole, and wherein the three first limiting protruding strips are evenly arranged along the inner wall of the via hole.

2. The display panel of claim 1, wherein the at least one first limiting protruding strip is an elongated structure extending from a top end of the groove wall of the first limiting groove and toward a bottom of the first limiting groove.

3. The display panel of claim 1, wherein the first substrate further comprises a limiting ring arranged outside the first limiting groove, and a height of the limiting ring is higher than that of the first limiting groove; wherein a diameter of the limiting ring corresponding to the first limiting groove is greater than a width of a groove opening of the first limiting groove; wherein a center of the first limiting groove is coincident with a center of the limiting ring.

4. The display panel of claim 3, wherein a height of the limiting ring is set to be equal to one fifth of a height of the spacer.

5. The display panel of claim 3, wherein the first substrate further comprises a plurality of extending protruding strips that are arranged between the limiting ring and the first limiting groove at intervals, and that are arranged in parallel with an extending direction of the first limiting groove toward the limiting ring.

6. The display panel of claim 5, wherein an interval between every two adjacent extending protruding strips is greater than or equal to a diameter of the spacer.

7. The display panel of claim 1, further comprising an auxiliary spacer, wherein a height of the auxiliary spacer is less than a height of the spacer; one end of the auxiliary spacer is disposed on the second substrate, and another end of the auxiliary spacer faces towards the first substrate, and wherein the auxiliary spacer is spaced apart from the spacer; wherein the first substrate further comprises a second limiting groove that is disposed on a side of the first substrate adjacent to the second substrate and that corresponds to a position of the auxiliary spacer, and wherein at least one second limiting protruding strip is arranged in the second limiting groove; wherein the auxiliary spacer is suspended.

8. The display panel of claim 1, wherein a surface of the side wall of the spacer that abuts against the at least one first limiting protruding strip is a first contact surface, a surface of the at least one first limiting protruding strip that abuts against the side wall of the spacer is a second contact surface, wherein the first contact surface and the second contact surface match with each other, and wherein both the first contact surface and the second contact surface are curved surfaces.

9. The display panel of claim 8, wherein curvatures of the first contact surface and the second contact surface are identical.

10. A display panel comprising an array substrate, a color filter substrate, and a spacer, wherein the array substrate and the color filter substrate are aligned and bonded together to form a cell, and the spacer is arranged between the array substrate and the color filter substrate; wherein one end of the spacer is disposed on the color filter substrate, and another end of the spacer faces towards the array substrate;
   wherein the array substrate further comprises a first limiting groove that is disposed on a side of the array substrate adjacent to the color filter substrate and that corresponds to a position of the spacer; the another end of the spacer extends into the first limiting groove;
   wherein at least one first limiting protruding strip is disposed on a groove wall of the first limiting groove, and a surface of the first limiting protruding strip facing towards the spacer abuts against a side wall of the spacer, defining a gap between the spacer and the groove wall in the first limiting groove;
   wherein the array substrate comprises a thin film transistor and a passivation layer disposed on the thin film transistor; wherein a via hole is formed between the passivation layer and the thin film transistor, and wherein a transparent conductive layer is disposed on an inner wall of the via hole;
   wherein the first limiting groove is the via hole; the at least one first limiting protruding strip is arranged in the via hole, defining a gap between the spacer and the transparent conductive, wherein the surface of the first limiting protruding strip facing the spacer is parallel to the sidewall of the spacer, wherein the at least one first protruding strip comprises at least two first limiting protruding strips, and a gap is further defined between every two adjacent first limiting protruding strips, and the transparent conductive layer is arranged at the gap between every two adjacent first limiting protruding strips.

11. A display device comprising a backlight module and a display panel, wherein the backlight module is arranged on a side of a light incident surface of the display panel, the display panel comprising a first substrate, a second substrate, and a spacer;
   wherein the first substrate and the second substrate are aligned and bonded together to form a cell; wherein the spacer is arranged between the first substrate and the second substrate; one end of the spacer is arranged on the second substrate, and another end of the spacer faces towards the first substrate;
   wherein the first substrate further comprises a first limiting groove that is disposed on a side of the first substrate adjacent to the second substrate and that corresponds to a position of the spacer, and wherein the another end of the spacer extends into the first limiting groove;
   wherein at least one first limiting protruding strip is disposed on a groove wall of the first limiting groove, and a surface of the at least one first limiting protruding strip facing towards the spacer abuts against a side wall of the spacer, defining a gap between the spacer and the groove wall of the first limiting groove;
   wherein the first substrate is an array substrate, the second substrate is a color filter substrate; wherein the first limiting groove is disposed on the array substrate, and the spacer is disposed on the color filter substrate;
   wherein the array substrate comprises a thin film transistor and a passivation layer disposed on the thin film transistor; wherein a via hole is formed between the passivation layer and the thin film transistor, and wherein a transparent conductive layer is disposed on an inner wall of the via hole;
   wherein the first limiting groove is the via hole, and the at least one first limiting protruding strip is arranged in the via hole, defining a gap between the spacer and the transparent conductive layer;
   wherein the surface of the at least one first limiting protruding strip facing towards the spacer is parallel to the sidewall of the spacer, wherein the at least one first limiting protruding strip comprises at least two first limiting protruding strips, and wherein a gap is further defined between every two adjacent first limiting protruding strips, and the transparent conductive layer is arranged at the gap between every two adjacent first limiting protruding strips.

* * * * *